(12) United States Patent
Holmes

(10) Patent No.: US 10,584,974 B2
(45) Date of Patent: Mar. 10, 2020

(54) PLATFORM FOR EXPERIENCING GEOTAGGED MEDIA CONTENT

(71) Applicant: Bose Corporation, Framingham, MA (US)

(72) Inventor: Ryan Terrill Holmes, Walnut Creek, CA (US)

(73) Assignee: BOSE CORPORATION, Framingham, CT (US)

( * ) Notice: Subject to any disclaimer, the term of this patent is extended or adjusted under 35 U.S.C. 154(b) by 79 days.

(21) Appl. No.: 15/716,924

(22) Filed: Sep. 27, 2017

(65) Prior Publication Data

US 2018/0094939 A1 Apr. 5, 2018

Related U.S. Application Data

(60) Provisional application No. 62/404,133, filed on Oct. 4, 2016.

(51) Int. Cl.
*G01C 21/34* (2006.01)
*G06Q 50/00* (2012.01)
(Continued)

(52) U.S. Cl.
CPC ....... *G01C 21/343* (2013.01); *G01C 21/3415* (2013.01); *G06F 16/487* (2019.01);
(Continued)

(58) Field of Classification Search
CPC ... G01C 21/3415; G01C 21/343; G06F 16/00; G06F 16/487; G06Q 50/01; H04L 67/18;
(Continued)

(56) References Cited

U.S. PATENT DOCUMENTS 8,634,712 B1 * 1/2014 Mullins .............. H04N 21/6156
348/14.02
8,892,032 B2 * 11/2014 Madhukar Lele .... H04W 8/205
455/41.1
(Continued)

OTHER PUBLICATIONS

Detour | About; https://web.archive.org/web/20150321130627/https://www.detour.com/; captured from the Internet May 15, 2018.
(Continued)

*Primary Examiner* — Babar Sarwar
(74) *Attorney, Agent, or Firm* — Bose Corporation

(57) ABSTRACT

Location-based media content can be consumed by end users via a software program that executes on a computing device. More specifically, the software program may be supported by a content distribution platform that allows multiple end users to experience the same location-based media content substantially simultaneously. The content distribution platform may also permit multiple computing devices to be synced. For example, the computing devices may be communicatively coupled over a first communication channel (e.g., via Bluetooth®) and/or a second communication channel (e.g., via the Internet or a cellular network). In some embodiments, the content distribution platform dynamically changes the media content based on real-life events, such as weather, ambient noise level, time of day, walking speed, etc. For example, a guided audio tour could be dynamically modified based on whether a business along the intended route is open when the end user(s) elect to begin the tour.

21 Claims, 9 Drawing Sheets

(51) Int. Cl.
  H04W 4/021  (2018.01)
  H04W 4/70   (2018.01)
  G06F 16/487 (2019.01)
  H04W 4/02   (2018.01)
  H04L 29/08  (2006.01)
  H04W 4/18   (2009.01)
  G06F 16/9537 (2019.01)

(52) U.S. Cl.
  CPC ......... *G06F 16/9537* (2019.01); *G06Q 50/01* (2013.01); *H04L 67/18* (2013.01); *H04L 67/2823* (2013.01); *H04L 67/2847* (2013.01); *H04W 4/02* (2013.01); *H04W 4/021* (2013.01); *H04W 4/18* (2013.01); *H04W 4/70* (2018.02)

(58) Field of Classification Search
  CPC .. H04L 67/2823; H04L 67/2847; H04W 4/02; H04W 4/021; H04W 4/18; H04W 4/70
  See application file for complete search history.

(56) References Cited

U.S. PATENT DOCUMENTS

| | | | |
|---|---|---|---|
| 8,966,360 B2 | 2/2015 | Phillips et al. | |
| 2006/0212220 A1* | 9/2006 | Bou-Ghannam | G01C 21/005 701/431 |
| 2008/0219658 A1* | 9/2008 | Keane | H04N 1/00244 396/429 |
| 2009/0006336 A1* | 1/2009 | Forstall | G06F 16/9535 |
| 2009/0325484 A1* | 12/2009 | Lele | H04W 8/205 455/41.1 |
| 2011/0165888 A1* | 7/2011 | Shuman | H04W 4/06 455/456.1 |
| 2012/0088523 A1* | 4/2012 | Shirakawa | G06Q 10/10 455/456.3 |
| 2012/0221687 A1* | 8/2012 | Hunter | G06F 16/435 709/219 |
| 2012/0303262 A1* | 11/2012 | Alam | G01C 21/3415 701/410 |
| 2014/0300775 A1* | 10/2014 | Fan | H04N 5/23229 348/231.3 |
| 2014/0307040 A1* | 10/2014 | Choi | H04W 4/18 348/14.01 |
| 2014/0317511 A1* | 10/2014 | Bailiang | G06F 3/04842 715/730 |
| 2015/0373281 A1* | 12/2015 | White | G06F 16/435 348/660 |
| 2016/0187152 A1* | 6/2016 | Tanizaki | G09B 29/005 701/414 |
| 2016/0323702 A1* | 11/2016 | Labrie | H04W 4/024 |
| 2016/0349063 A1* | 12/2016 | Maurer | G08G 1/096833 |
| 2018/0094939 A1* | 4/2018 | Holmes | H04W 4/70 |

OTHER PUBLICATIONS

Detour | Location-Aware Audio Tours; https://web.archive.org/web/20150315081217/https://www.detour.com/; captured from the Internet May 15, 2018.

Detour, Andrew Mason's Audio Tour App, Goes Global and Expands to 6 More Cities; https://techcrunch.com/2015/06/11/detour-andrew-masons-audio-tour-app-goes-global-and-expands-to-6-more-cities/; TechCrunch; posted Jun. 11, 2015; captured from the Internet Feb. 22, 2018.

\* cited by examiner

PLATFORM FOR EXPERIENCING GEOTAGGED MEDIA CONTENT

CROSS-REFERENCE TO RELATED APPLICATIONS

This application claims priority to U.S. Provisional Patent Application No. 62/404,133, titled "Platform for Experiencing Geotagged Media Content" and filed on Oct. 4, 2016, which is incorporated by reference herein in its entirety.

FIELD OF THE INVENTION

At least one embodiment of the present disclosure pertains to geotagged media content and, more particularly, to software programs through which consumers can experience geotagged media content.

BACKGROUND

Geotagging refers to the process of adding geographical identification metadata to media content. Examples of media content include images, videos, and messages (e.g., email messages or text messages). The metadata typically includes latitude and longitude coordinates, although other information could also be included. For example, the metadata may specify an altitude, bearing, distance from a specified location, location name/identifier, indicator of accuracy, or indoor data such as floor information, room information, etc.

Geotagging is often used to help individuals to find location-specific information from a computing device, such as a mobile phone, tablet computer, or laptop computer. For example, an individual may perform a search for images taken near a particular location or conduct a search for location-based news, websites, or other resources. Some social media platforms (e.g., Facebook® and Twitter®) also show content that is relevant to a location associated with an individual. Oftentimes, the location is determined from data received from the computing device on which the individual accesses the social media platform. The data could include, for example, Global Positioning System (GPS) coordinates.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

Figure 1A:
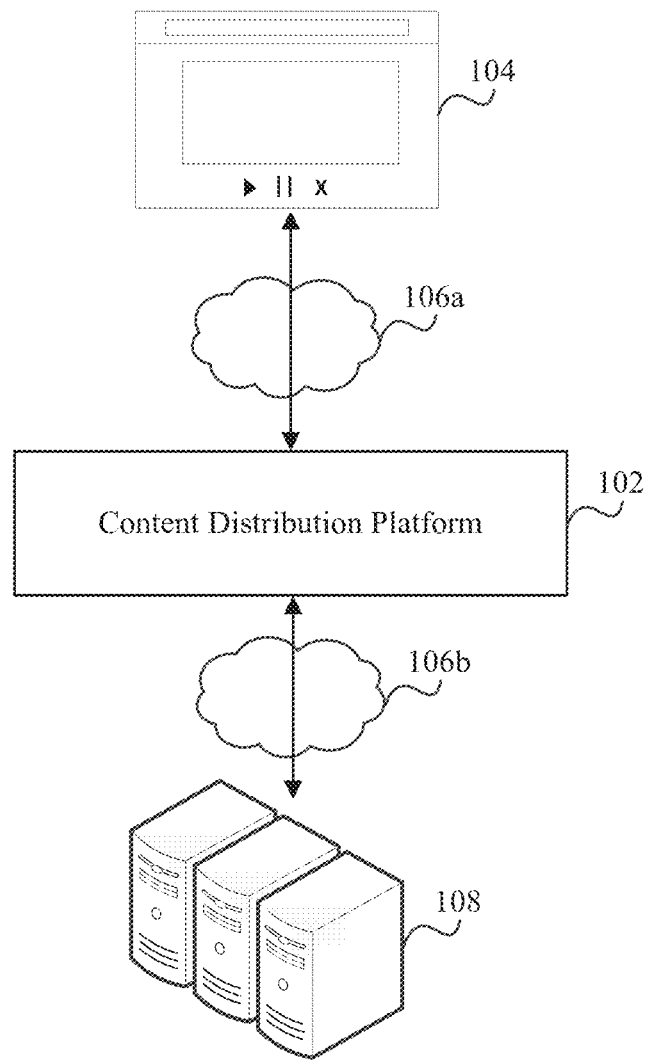
FIG. 1A illustrates a network environment that includes a content distribution platform responsible for creating interfaces through which end users can consume location-based media content.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here is a network-accessible platform that enables end users to experience location-based media content. More specifically, various embodiments pertain to software programs that are supported by the network-accessible platform, which may generate the interfaces (also referred to as "graphical user interfaces" or "GUIs") through which end users consume the location-based media content. Examples of location-based media content include television programs, radio programs, podcasts, audio tours (e.g., guided tours of cities, buildings, parks, or campuses), lessons, advertisements, games (e.g., augmented reality video games), etc.

The interfaces may be accessible via a web browser, desktop software program, mobile application, and/or over-the-top (OTT) application. In some embodiments, the interfaces are entirely browser based. Thus, the interfaces may be generated/managed by a remote computing device (e.g., a computer server) rather than the local computing device used by the end user to access the web browser. Alternatively, the interfaces may be entirely application based. For example, the interfaces may be generated by a mobile application executing on the local computing device used by the end user to interact with the location-based media content.

The software program may allow multiple users (also referred to as a "group" of users) to experience the same location-based media content substantially simultaneously by syncing the computing devices associated with the group members. In some embodiments, the network-accessible is responsible for syncing the computing devices by digitally pairing the user devices over one or more network connections. In other embodiments, the software program is responsible for syncing the computing devices by digitally pairing the user devices over one or more network connections. Accordingly, the network-accessible platform may be unaware that groups are being formed prior to consumption of location-based content.

Often, the network-accessible platform will pair two computing devices over multiple network connections distributed across different communication channels to protect against dropped connections. For example, the network-accessible platform may initiate a first connection directly between the computing devices (e.g., using a Bluetooth® channel) and a second connection between the computing devices via the network-accessible platform (e.g., using an internet channel). Those skilled in the art will recognize that other communication protocols could also be used, such as Wi-Fi, Near Field Communication (NFC), cellular, infrared, radio-frequency identification (RFID), etc.

The network-accessible platform could also dynamically modify the location-based media content based on real-life events, such as the weather, ambient noise level, time of day, day of the week, walking speed of the end user, etc. For example, a guided audio tour could be dynamically modified based on whether a business is open when the end user(s) elect to begin the tour or whether the intended route is impeded (e.g., due to construction or a scheduled/unscheduled event). These modifications may require that the network-accessible platform or the computer program remove existing segments of media content, alter existing segments of media content, or add new segments of media content. Thus, modifications may be performed in response to the network-accessible platform discovering that the geographical location of the computing device does not match the expected location along a route associated with the location-based media content due to a temporal misalignment and/or geographical misalignment.

Generally, the software program is designed for execution by a specific operating system, such as Microsoft Windows®, Apple macOS®, Apple iOS, Linux® (and its variants), Google Android®, etc. While certain embodiments may be described in the context of a certain type of software program, those skilled in the art will recognize that the features are equally applicable to other software program types.

Thus, the software program may be downloaded by the end user from a network-accessible environment (e.g., a digital distribution platform accessible via a website or application store (also referred to as an "app store")). Moreover, the software program may be configured to automatically launch in response to determining the computing device has come within a specified proximity of a certain geographical location. For example, a previously-purchases audio tour for the Tenderloin neighborhood of San Francisco, Calif., could be automatically downloaded by the computing device upon determining that the user device has come within a specified proximity of the starting location or the Tenderloin neighborhood as a whole.

Different system architectures could be used to build the network-accessible platform. The network-accessible platform may be executed by a cloud computing service operated by, for example, Amazon Web Services® (AWS) or a similar technology. Moreover, the network-accessible platform could reside on a single instance of AWS, though different interfaces or pieces of media content may be supported by different containers using different Internet Protocol (IP) addresses for network access.

Often, a host computer server is responsible for supporting the network-accessible platform. The host computer server may be communicatively coupled to one or more content computer servers that include media content and other assets. Note, however, that the network-accessible platform could also be designed so that it can function without a host computer server.

Terminology

References in the present disclosure to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and comprising" are to be construed in an inclusive sense rather than an exclusive or exhaustive sense (i.e., in the sense of "including but not limited to"). The terms "connected," "coupled," or any variant thereof is intended to include any connection or coupling, either direct or indirect, between two or more elements. The coupling/connection can be physical, logical, or a combination thereof. For example, two devices may be electrically and/or communicatively coupled to one another.

When used in reference to a list of multiple items, the word "or" is intended to cover all of the following interpretations: any of the items in the list, all of the items in the list, and any combination of items in the list. Meanwhile, if the present disclosure states that a feature "may," "can," "could," or "might" be included or have a characteristic, that particular feature is not required and need not necessarily have the characteristic.

The term "module" refers broadly to software, hardware, and/or firmware components. Modules are typically functional components that generate useful data and/or other output(s) based on specified input(s). A software program may include one or more modules, or a module may include one or more software programs.

System Topology Overview

FIG. 1A illustrates a network environment 100a that includes a content distribution platform 102 responsible for creating interfaces through which end users can consume location-based media content. Examples of media content include audio-based content (e.g., radio segments, podcasts, and tours) and video-based content (e.g., television programs and presentations). As further described below, end users (also referred to as "content consumers") can interface with the content distribution platform 102 via a network-accessible interface 104.

Figure 1B:
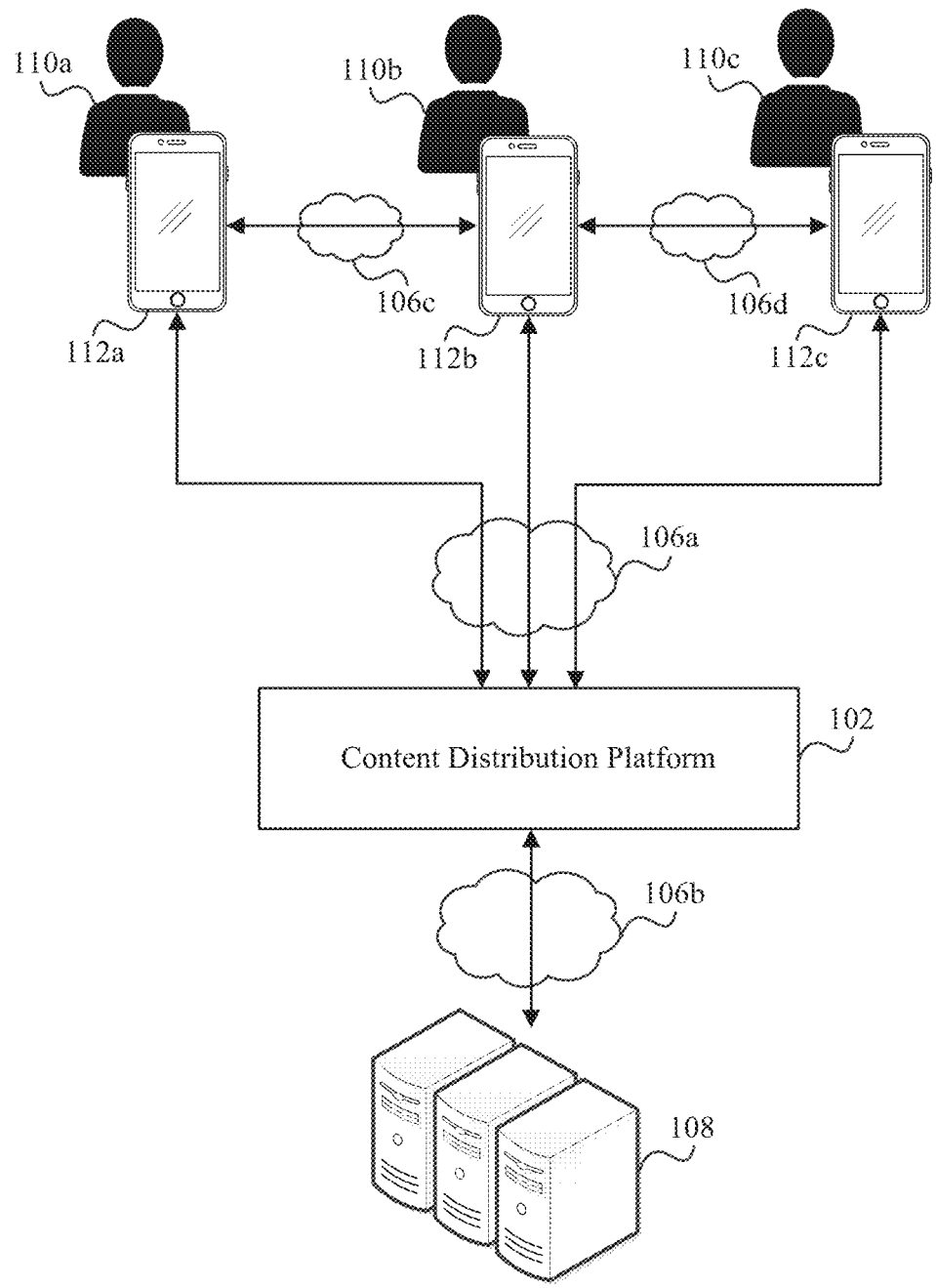
FIG. 1B illustrates a network environment that includes multiple computing devices corresponding to different end users.

FIG. 1B, meanwhile, illustrates a network environment 100b that includes multiple computing devices 112a-c corresponding to different end users 110a-c. End users 110a-c will often consume location-based media content independent of other end users. In such instances, the computing device corresponding to an end user can connect directly to the content distribution platform 102. However, some end users could also decide to consume location-based media content together. In such instances, the computing devices corresponding to the end users may also connect to one another. Here, for example, computing device 112a is communicatively coupled to computing device 112b, which is also communicatively coupled to computing device 112c.

The content distribution platform 102 may reside in a network environment 100. Thus, the content distribution platform 102 may be connected to one or more computer networks 106a-b, which may include local area networks (LANs), wide area networks (WANs), metropolitan area networks (MANs), cellular networks, the Internet, etc. Other wired communication channels or wireless communication channels could also be used. For example, computing devices may be connected to each other via one or more computer networks 106*c-d*, which may include Bluetooth®, NFC, etc.

The network-accessible interface 104 is preferably accessible via some combination of a web browser, desktop software program, mobile application, or over-the-top (OTT) application. Accordingly, the network-accessible interface 104 may be viewed on a personal computer, tablet computer, personal digital assistant (PDAs), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality system (e.g., a head-mounted display such as Oculus Rift® and Microsoft Hololens®), or some other electronic device.

After accessing the network-accessible interface 104 on a computing device, an end user may be able to download, play, modify, etc., the location-based content associated with a particular experience. An experience could be, for example, an audio tour of a specified neighborhood, a television program pertaining to a specified topic, a video game, etc. In some embodiments, the content distribution platform 102 facilitates the download of media content required by the experience. For example, a mobile application executing on a mobile phone may pre-download some or all of the media content required for a specified experience, and then operate in an offline mode while the media content is being consumed. Media content could be downloaded before the experience is initiated, when the computing device has a high-bandwidth network connection exceeding a specified threshold, during periods of low usage, etc. In other embodiments, the content distribution platform 102 facilitates the streaming of some or all of the media content in real time.

The content distribution platform 102 can support the software program executing on the computing devices 112*a-c* by providing location-based media content (also referred to as "geotagged media content"). For example, location-based media content could be downloaded by a computing device upon being purchased by an end user, determining that the computing device has come within a specified proximity of a certain location (e.g., the starting location of an experience) or certain device (e.g., a known Wi-Fi network or another computing device), etc.

These techniques can be performed in addition to local syncing with other computing devices. For example, as shown in FIG. 1B, software programs supported by the content distribution platform 102 can enable multiple users 110*a-c* to form a group and experience location-based media content substantially simultaneously. More specifically, either the content distribution platform 102 or the software programs executing or the computing devices 112*a-c* may initiate one or more network connections between the computing devices 112*a-c* associated with the group members 110*a-c*.

Media content could reside on the computing device on which an end user accesses the network-accessible interface 104, on a content server 108 accessible to the content distribution platform 102, etc. Thus, media content may be hosted locally and/or remotely.

While certain embodiments are described in the context of network-accessible interfaces, those skilled in the art will recognize that the interfaces need not necessarily be accessible via a network. For example, a computing device associated with an end user may be configured to execute a self-contained software program (e.g., a desktop software program or mobile application) that does not require network access. Instead, the self-contained software program may cause all necessary assets (e.g., instruction sets and media content) to be downloaded at a single point in time or on a periodic basis (e.g., daily or weekly).

The content distribution platform 102 may be executed by a cloud computing service operated by, for example, Amazon Web Services® (AWS) or a similar technology. Often, the content distribution platform 102 resides on a host computer server that is communicatively coupled (e.g., via a network) to one or more content computer servers. The content computer server(s) can include media content (e.g., location-based media content) associated with different experiences, end user information (e.g., profiles, login credentials, registration details), and other assets. Additionally or alternatively, such information could be stored on the host computer server.

FIGS. 2A-F include various interfaces that enable an end user to experience location-based media content. These interfaces can be presented by a software program (e.g., a mobile application) executing on a computing device (e.g., a mobile phone). In some embodiments, the interfaces also enable end users to readily form or join groups of other end users who intend to consume location-based media content substantially simultaneously.

Certain actions may be described as being performed by the software program for the purpose of illustration only. Those skilled in the art will recognize that a content distribution platform (e.g., content distribution platform 102 of FIG. 1) can perform the same or similar actions. In fact, some actions may be performed by the software program (e.g., time-sensitive tasks or security-sensitive tasks) while other actions may be performed by the content distribution platform (e.g., resource-intensive tasks).

Figure 2C:
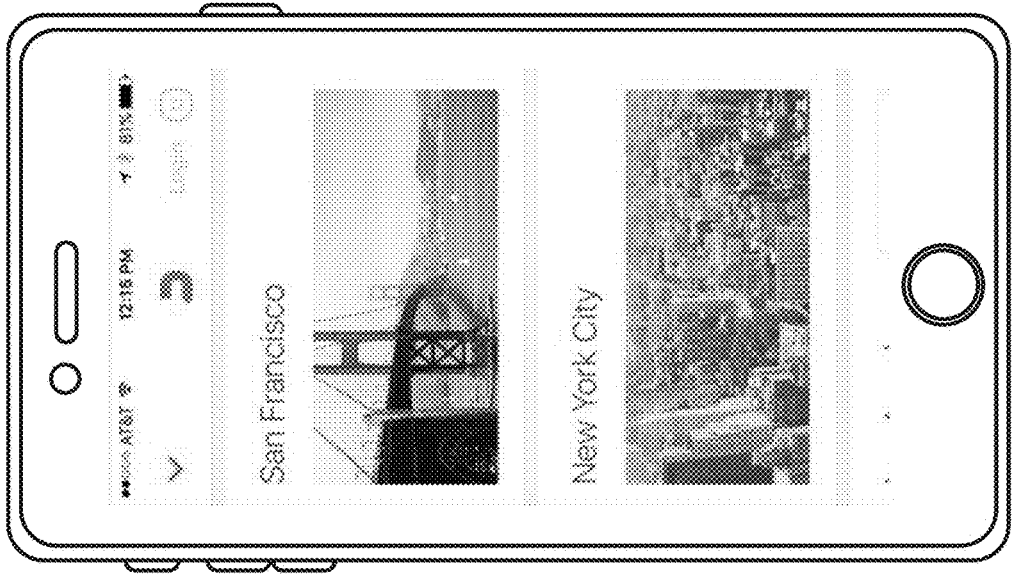
FIG. 2C depicts an interface that may enable an end user to select individual experiences associated with particular geographical locations (e.g., San Francisco and New York City).
Figure 2B:
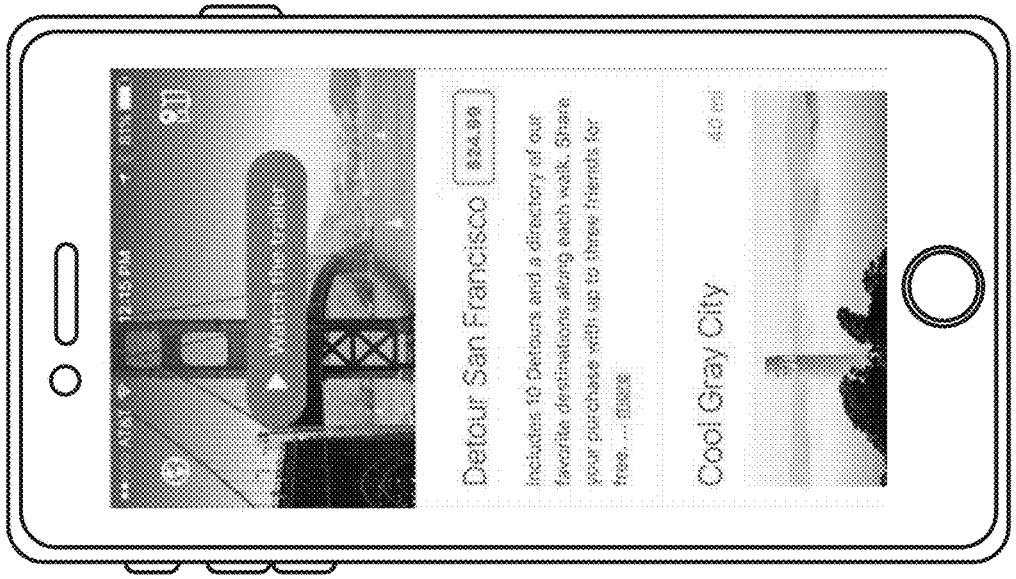
FIG. 2B depicts an interface that may enable an end user to purchase individual content-based experiences (e.g., audio tours, television programs, or video games) and/or subscribe for a series of experiences for a particular geographic location (here, San Francisco).
Figure 2A:
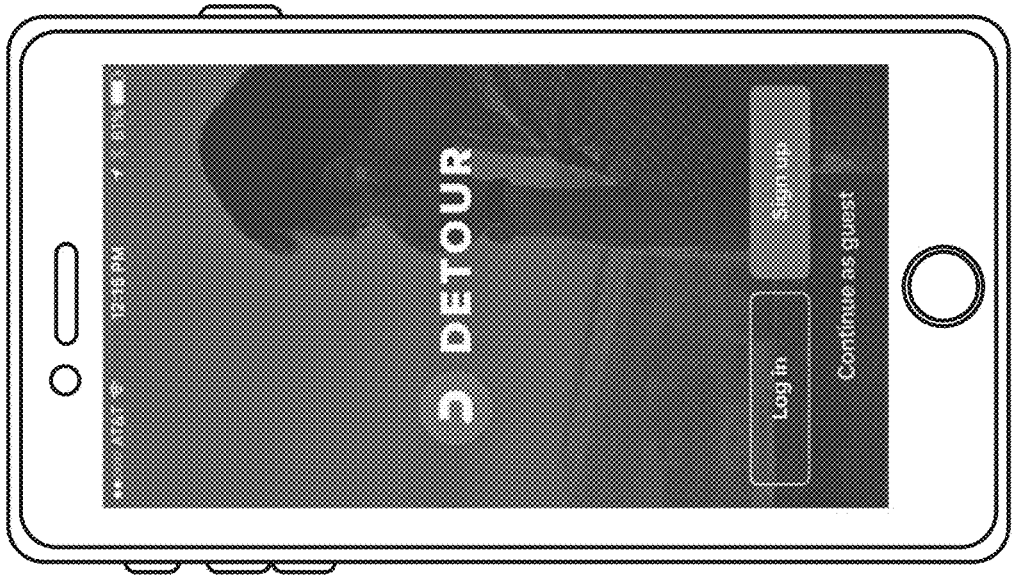
FIG. 2A depicts an interface that may enable an end user to sign up for a content service that is responsible for managing the software program responsible for creating the interface, validating login credentials associated with an account for the content service, etc.

As shown in FIG. 2A, an interface may allow an end user to sign up for a content service that is responsible for managing the software program responsible for creating the interface, validating login credentials associated with an account for the content service, etc. Logging in may permit the end user to make use of several different features. For example, the end user may be able to browse content-based experiences available for purchase. As another example, the end user may be able to stream or download media content associated with previously-purchased experiences.

Moreover, upon logging in, the end user may be permitted to access certain interfaces (e.g., feedback forms or help forms) that are inaccessible to guests who do not register or log in upon opening the software program. In some embodiments, the software program allows the end user to consume location-based media content without logging in. That is, the end user may be able to continue using certain features of the software program as an anonymous or semi-anonymous guest. For example, the end user may be able to consume free media content as a guest, but the software program may require the end user log in upon determining that the end user has requested to complete a purchase of purchasable media content.

As shown in FIG. 2B, an end user may be able to purchase individual content-based experiences (e.g., audio tours, television programs, or video games) and/or subscribe for a series of experiences for a particular geographic location (here, San Francisco). Examples of media content include images, videos, messages (e.g., email messages or text messages), and associated metadata. Examples of content-based experiences include television programs, radio programs, podcasts, audio tours (e.g., guided tours of cities, buildings, parks, or campuses), lessons, advertisements, games (e.g., augmented reality video games), etc.

When the end user selects an experience, a full copy of the media content required by that experience can be downloaded to the computing device. This ensures that the end user can complete the experience by consuming the media content even if a network connection is not available when the end user wishes to begin the experience. As further described below, downloading a full copy of the media content to the computing device also enables the end user to continue the experience should the end user be separated from, or elect to leave, a group of end users who desire to participate in the experience together.

Alternatively, some or all of the media content could be hosted by a content distribution platform (e.g., content distribution platform 102 of FIG. 1) residing on a host computer server or a content computer server (e.g., content computer server 108 of FIG. 1). In such embodiments, at least some of the media content may be streamed to the computing device in real time or subsequently downloaded at a later point in time (e.g., upon receiving a request from the computing device).

As shown in FIG. 2C, an end user can select individual experiences associated with particular geographical locations (e.g., San Francisco and New York City). Upon receiving input indicative of a selection of an experience, the content distribution platform can make media content associated with the selected experience accessible to the end user. For example, the content distribution platform may push some or all of the media content associated with the selected experience to the computing device on which the software program is hosted.

In some embodiments, the software program generates a link or visual element (e.g., a digital button) that allows the end user to create or join a group of users who are interested in concurrently participating in the same experience. The software program (or the content distribution platform) can sync the computing devices associated with the group members so that location-based media content can be experienced at substantially the same time by all members of the group.

Syncing may be performed locally by directly coupling the computing devices to one another, or by connecting the computing devices to one another via the content distribution platform. Often, the computing devices are synced over multiple communication channels in order to be as robust as possible. For example, the software program may initiate a first connection directly between the computing devices (e.g., using a Bluetooth® channel) and a second connection between the computing devices via the network-accessible platform (e.g., using an Internet channel). Those skilled in the art will recognize that other communication protocols could also be used, such as Wi-Fi, NFC, cellular, infrared, RFID, etc.

Some or all of the computing devices could also send data to the content distribution platform over the Internet as part of a simple messaging service. The data could include location metadata specifying Global Positioning System (GPS) coordinates, wireless access point (WAP) identifiers (e.g., a Wi-Fi router identifier), etc. Additionally or alternatively, the data could content metadata specifying a current play time, frame, segment, etc.

In some embodiments, only one computing device communicates with the content distribution platform. This computing device may be referred to as the "master device" or "leader device." Thus, the content distribution platform can facilitate a peer-to-peer communication framework with a strong leadership model. The high-level architecture of the environment can also be described as enabling an offline, peer-to-peer communication of data with an online fallback. The content distribution platform may rely on this architecture in order to consistently impose a single known state for the location-based media content on the entire group, which guarantees that all members of the group experience the location-based media content at substantially the same time.

Note, however, that the content distribution platform need not necessarily sync the location-based media content itself. Instead, messages could be broadcast between the computing devices and/or from the computing devices to the content distribution platform that specify one or more characteristics of the location-based media content, such as the current play time, segment, or frame, as well as the current geographical location of the computing device. These messages are abstract representations of a computing device's current state. Because the messages generally only consists of slight weight metadata, the messages are typically fairly small and can be easily transmitted between the computing devices (e.g., via a Bluetooth® connection) and/or to the content distribution platform (e.g., via the Internet or a cellular network connection). The content distribution platform can ensure a consistent global state within the group from the metadata because each computing device may already include a full copy of the location-based media content and all other required information (e.g., the underlying structure for an experience).

Because one of the primary communication channels between a group of computing devices is often Bluetooth®, each end user may be able to experience the location-based media content completely offline and continue to run on peer-to-peer local connections. However, the offline nature of the underlying sync technology typically requires that one computing device be recognized as a "master device" that takes cues (e.g., receives and analyzes messages) from the other computing devices in the group. The master device may also be responsible for communicating with the content distribution platform on behalf of the group, ensuring that the location-based media content on each computing device remains in sync, and triggering the playback of certain media content.

In some embodiments, the leader device also uses group sync to share the processing load between the group of computing devices. For example, the leader device may have different computing devices periodically upload location metadata (e.g., GPS coordinates) to the content distribution platform to reduce the power drained from any particular computing device. Similarly, the responsibilities of the leader device may be shared or passed between different computing devices. Thus, different computing devices may be considered the leader device throughout an experience.

Figure 2F:
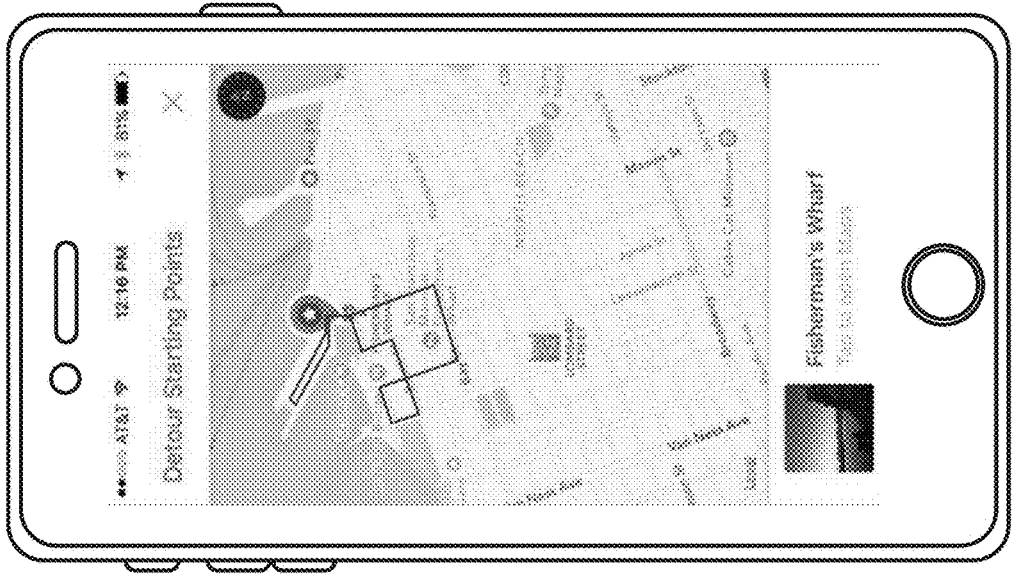
FIG. 2F illustrates how, after receiving input indicative of a selection of an experience, a software program may display a route that indicates where the end user is expected to travel during the experience.
Figure 2E:
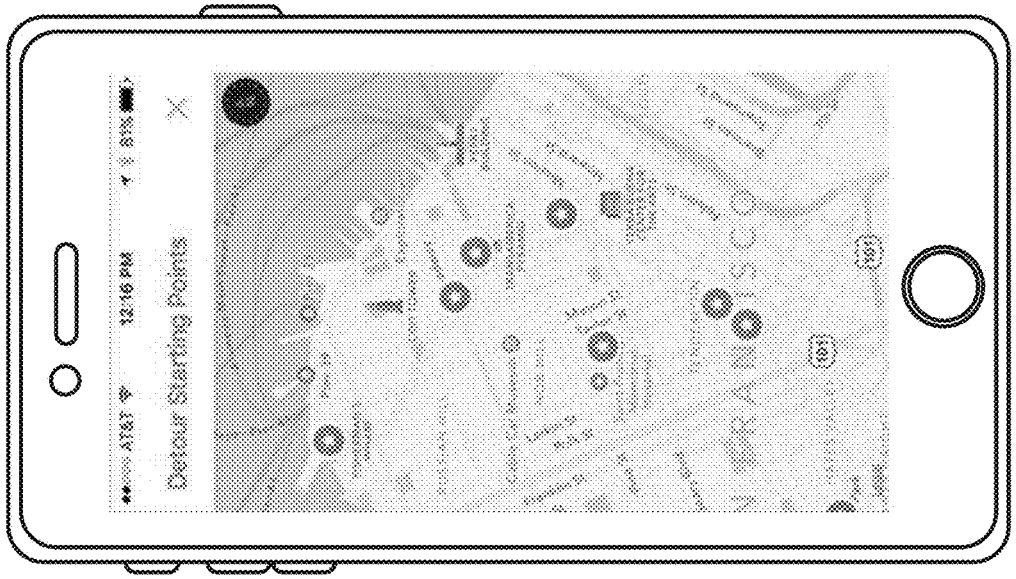
FIG. 2E depicts another interface that enables an end user to view different experiences as they are overlaid on a map.
Figure 2D:
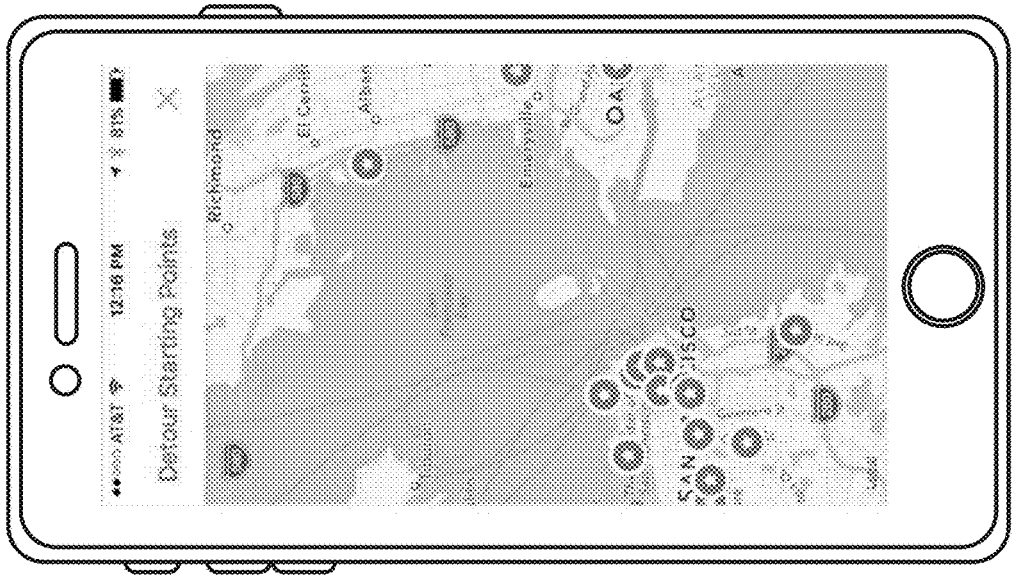
FIG. 2D depicts an interface that enables an end user to view different experiences as they are overlaid on a map.

As shown in FIGS. 2D-E, an end user may be able to view different experiences as they are overlaid on a map. Here, for example, the software program depicts a series of starting points for guided, audio-based tours around San Francisco, Calif. Each starting point can correspond to a different interactive experience (and, thus, different location-based media content). As shown in FIG. 2F, after receiving input indicative of a selection of an experience, the software program may display a route that indicates where the end user is expected to travel during the experience.

Before starting the experience, a link or visual element (e.g., a digital button) may be presented by the software program that enables the end user to form or join a group of end users who are interested in participating in the same experience. The software program or the content distribution platform responsible for supporting the software program can then sync the computing devices corresponding to these end users so that the location-based media content played by each computing device remains substantially in sync. Group members may be able to seamlessly enter and exit the group at any time.

As the end user participates in the experience, the computing device can continually monitor its location and then report the location (e.g., as location metadata embedded within a message) to the content distribution platform via the software program. Location can be accurately tracked regardless of whether the computing device is indoors or outdoors. For example, location metadata could include GPS coordinates, WAP identifiers (e.g., a Wi-Fi router identifier), etc., that are compared to geographical trigger points associated with the location-based media content. Generally, the geographical trigger points are defined within a set of rules that govern when certain media content is to be presented by the software program.

The content distribution platform or the software program can dynamically modify the experience based on the location of the computing device. Said another way, as the computing device moves in the real world, different tracks of the location-based media content can be triggered. For instance, a certain sound effect could be triggered when the computing device comes within a specified proximity of a GPS trigger point, while a certain vocal track (e.g., "Walk towards the counter and order a sandwich.") could be triggered when the computing device comes within a specified proximity of a WiFi trigger point.

The location-based media content could be dynamically modified (based on implicit and explicit actions of the user. For example, if the end user begins to walk more quickly or slowly, a timeline may be automatically modified. These modifications may require that the content distribution platform or the computer program remove existing segments of media content, alter existing segments of media content, or add new segments of media content.

Thus, modifications may be performed in response to the network-accessible platform discovering that the geographical location of the computing device does not match the expected location along a route associated with the location-based media content due to a temporal misalignment and/or geographical misalignment. For example, unnecessary breaks may be removed or shortened for walkers proceeding along the route more quickly than expected. As another example, breaks may be lengthened or added for walkers proceeding along the route more slowly than expected. As yet another example, an instruction (e.g., an audible instruction or a visual instruction) intended to guide an end user back to the route may be presented after determining that the end user has strayed from the route.

Generally, these instructions are presented only if the distance between the end user and the route exceeds a specified amount. Such action ensures that the software program does not attempt to correct minor adjustments made by the end user to due construction, crowds, etc. Accordingly, the software program may continually monitor metadata specifying the geographical location of the computing device, determine whether the geographical location of the computing device matches an expected location along the route, and then dynamically modify the location-based media content if these locations either do not match or are not within a specified proximity of one another.

The software program may also facilitate location-based experiences beyond geotagged media content by providing a full feature location guide, including a directory of things to do and a map with turn-by-turn directions.

Figure 3:
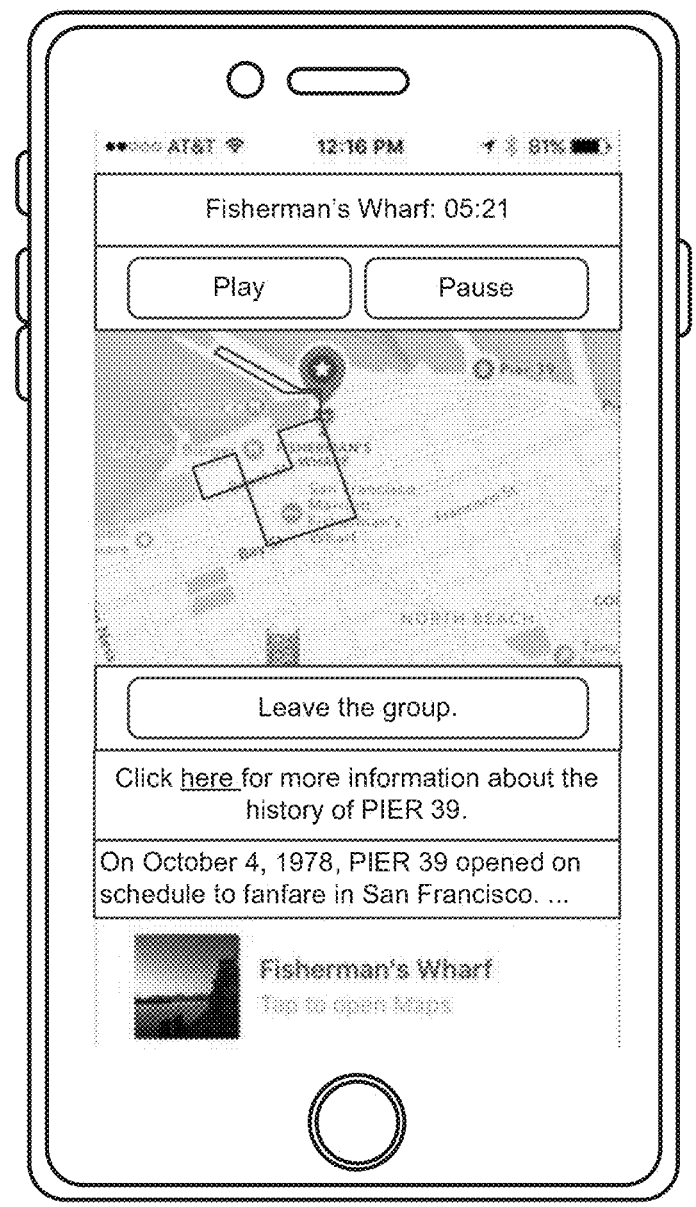
FIG. 3 illustrates how the software program typically allows the end user to control location-based media content on demand.

As shown in FIG. 3, the software program typically allows the end user to control location-based media content on demand. For example, the end user could play or pause an audio file corresponding to a guided audio tour (here, for Fisherman's Wharf). However, when the end user is part of a group, only the end user associated with the leader device may be able to play or pause the location-based media content.

The software program could also simultaneously present other content (e.g., images, video, advertisements, or links to outside materials such as websites) that corresponds to, or is independent from, the location-based media content currently being presented by the software program. Here, for example, a selectable hyperlink to an external resource (e.g., a website) and a transcript of the guided audio tour is shown by the software program.

Figure 4:
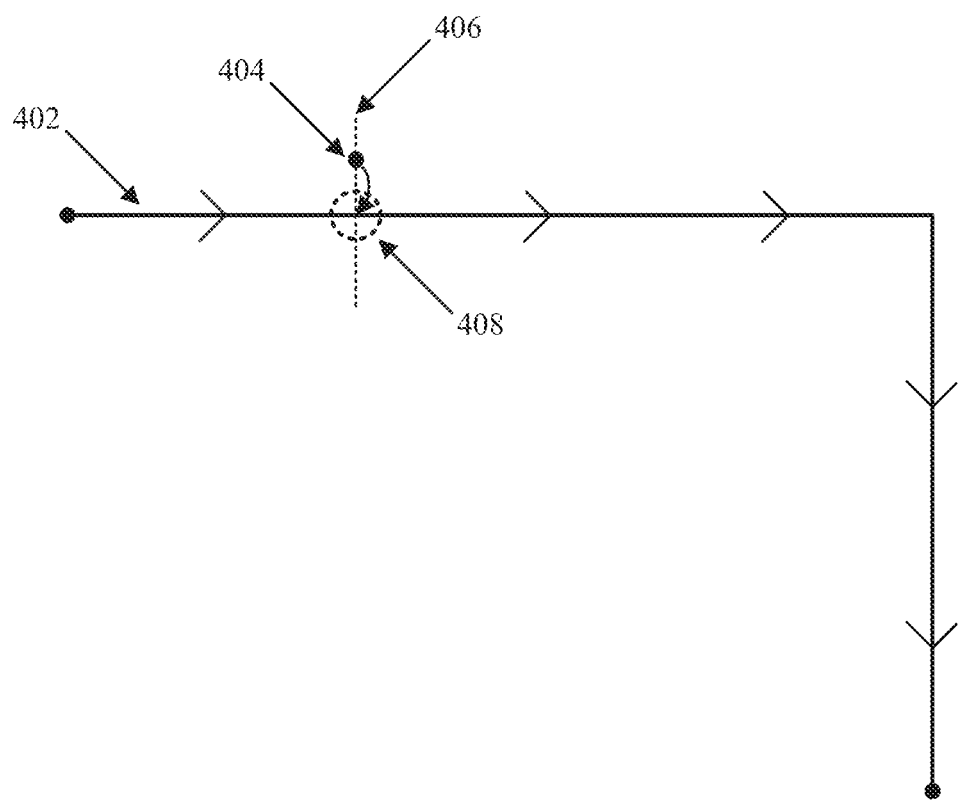
FIG. 4 depicts how a software program can intelligently monitor the location of a computing device (a process also referred to as "pathfinding").

FIG. 4 depicts how the software program can intelligently monitor the location of a computing device (a process also referred to as "pathfinding"). These techniques are particularly valuable when the computing device is presenting location-based media content, such as a guided audio tour.

A path may be created when a developer creates a location-based experience involving one or more types of media content. For example, a path could be constructed for a guided audio tour based on the placement of multiple geographical trigger points. When an end user participates in an experience, a content distribution platform or a software program can determine what media content should be presented to the end user by monitoring the location of the computing device responsible for executing the software program. For example, the content distribution platform may analyze geographical metadata uploaded by the computing device. As another example, the software program may examine geographical metadata created by the computing device. Such action may occur periodically or continually. Geographical metadata may include GPS coordinates, WAP identifiers (e.g., a Wi-Fi router identifier), verbal indications (e.g., "I'm at the corner of Main Street and Green Street."), audio identifiers (e.g., sounds indicative of certain locations, such as train stops, athletic stadiums, or restaurants), etc.

In some embodiments, the content distribution platform continually queries the computing device regarding its position so long as the available bandwidth or connectivity status meets a specified threshold. Should these measure(s) fall below the specified threshold, the content distribution platform may periodically query the computing device regarding its position. In some embodiments, the geographical metadata is uploaded by the software program (e.g., a mobile application) executing on the computing device that is associated with, and supported by, the content distribution platform.

Often, the geographical metadata will indicate that the end user has strayed from the intended path 402. This may be due to the natural inaccuracy of position tracking or user action (e.g., the end user may be located on the wrong side of the street). In order to enable a seamless interactive experience, the content distribution platform can intelligently "snap" the end user's location to the intended path 402. More specifically, the content distribution platform can determine the end user's location 404 when the computing device enters or passes a specified area. Here, for example, when the end user crosses the illustrate axis 406, the content distribution platform may act as though the end user is actually present within the trigger point area 408. Such action allows the content distribution platform to facilitate a more seamless content-based experience that requires the end user's location be monitored, despite issues that may cause the end user to stray from the intended path 402.

Figure 5:
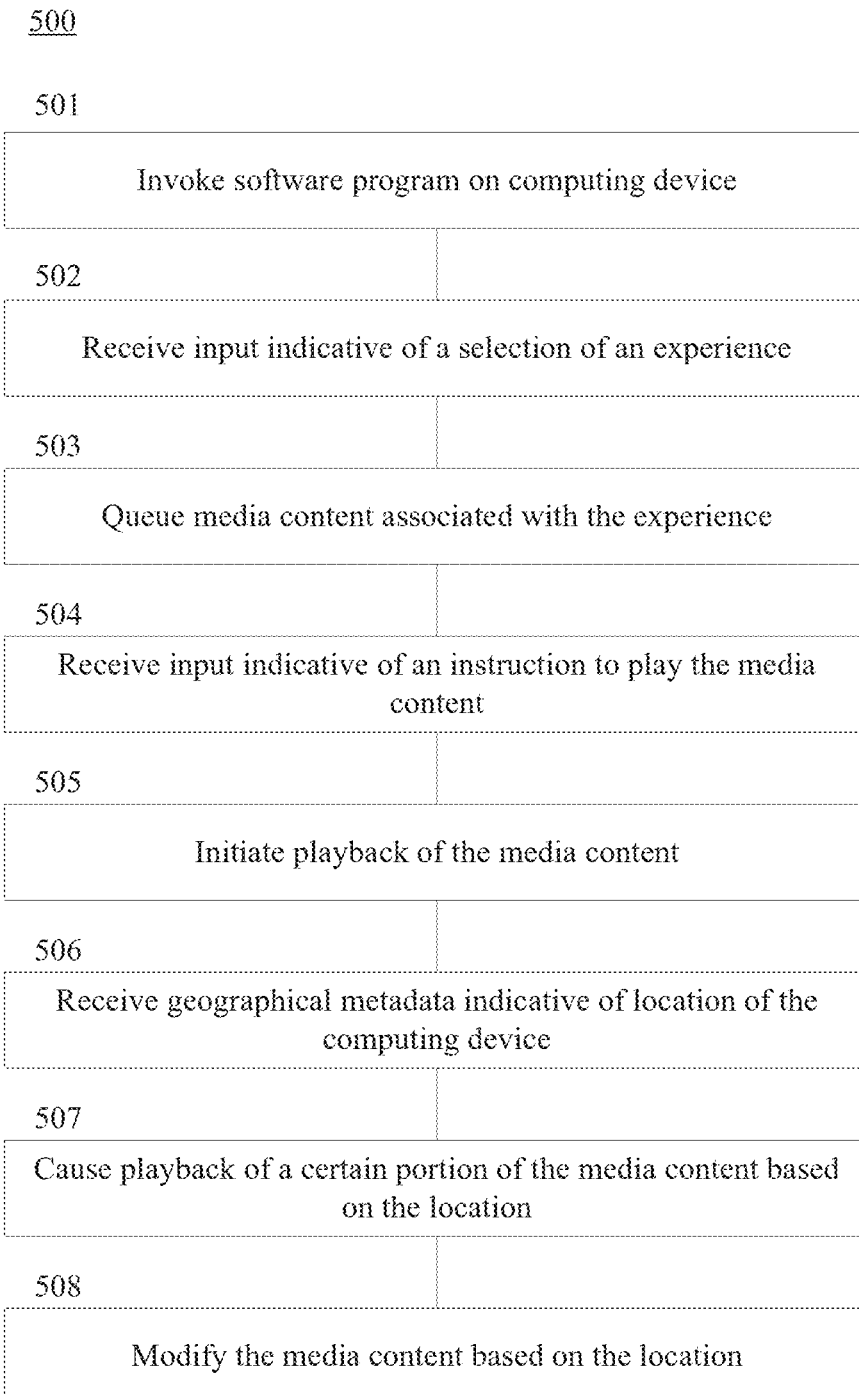
FIG. 5 depicts a flow diagram of a process for presenting location-based media content.

FIG. 5 depicts a flow diagram of a process 500 for presenting location-based media content. Initially, an end user causes a software program to be invoked by a computing device (step 501). For example, the end user may select an icon visible on the display of a mobile phone to initiate a mobile application.

As shown in FIG. 2A, the software program may initially present an interface that enables the end user to log into the software program, a content service, etc. The software program may be supported by a content distribution platform that is communicatively coupled to the computing device across a network. For example, the content distribution platform may communicate with the software program through one or more application programming interfaces (APIs).

The content distribution platform can receive input indicative of a selection of an experience by the end user through the software program (step 502). The end user may browse, for example, guided audio tours, interactive television programs, video games, etc. The content distribution platform can then queue media content associated with the selected experience (step 503). The media content can include location-based media content and non-location-based media content.

Some or all of the media content required for the experience may already be stored on the computing device. For example, all location-based media content needed for the experience could be downloaded when the end user purchases the experience. As another example, core media content (e.g., media content that is absolutely necessary for the experience) may be downloaded when the end user purchases the experience, while supplemental content (e.g., additional sound effects and background music) could be downloaded when the end user elects to begin the experience. Thus, at least some of the media content could be streamed to the computing device in real time. In some embodiments, the content distribution platform queues location-based media content automatically upon determining the user device has come within a specified proximity of a geographical location (e.g., the starting point of a guided audio tour).

The content distribution platform can receive input indicative of an instruction to play the media content (step 504). Said another way, the content distribution platform may receive input indicative of a request to begin the experience. The instruction could be in the form of a vocal command (e.g., "Begin the tour.") or a physical interaction with the computing device (e.g., the selection of a mechanical element or digital element accessible on the computing device). The content distribution platform can then initiate playback of the media content associated with the experience (step 505).

In some embodiments, the content distribution platform receives geographical metadata from the computing device indicative of location (step 506). The geographical metadata may include GPS coordinates, WAP identifiers (e.g., a Wi-Fi router identifier), verbal indications (e.g., "I'm at the corner of Main Street and Green Street."), audio identifiers (e.g., sounds indicative of certain locations, such as train stops, athletic stadiums, or restaurants), etc. The content distribution platform may cause playback of a certain portion of the media content based on the location (step 507). Certain portions of the media content only be presented in response to determining that the computing device has come within a specified proximity of a certain geographical location. Accordingly, the content distribution platform can ensure that playback of some experiences (e.g., guided audio tours) corresponds to physical movement of the computing device in the real world.

The content distribution platform could also modify the media content based on the location (step 508). A modification may include the removal of existing segments of media content, alteration of existing segments of media content, or addition of new segments of media content. For example, unnecessary breaks may be removed or shortened for fast walkers. As another example, breaks may be lengthened or added for slow walkers.

Figure 6:
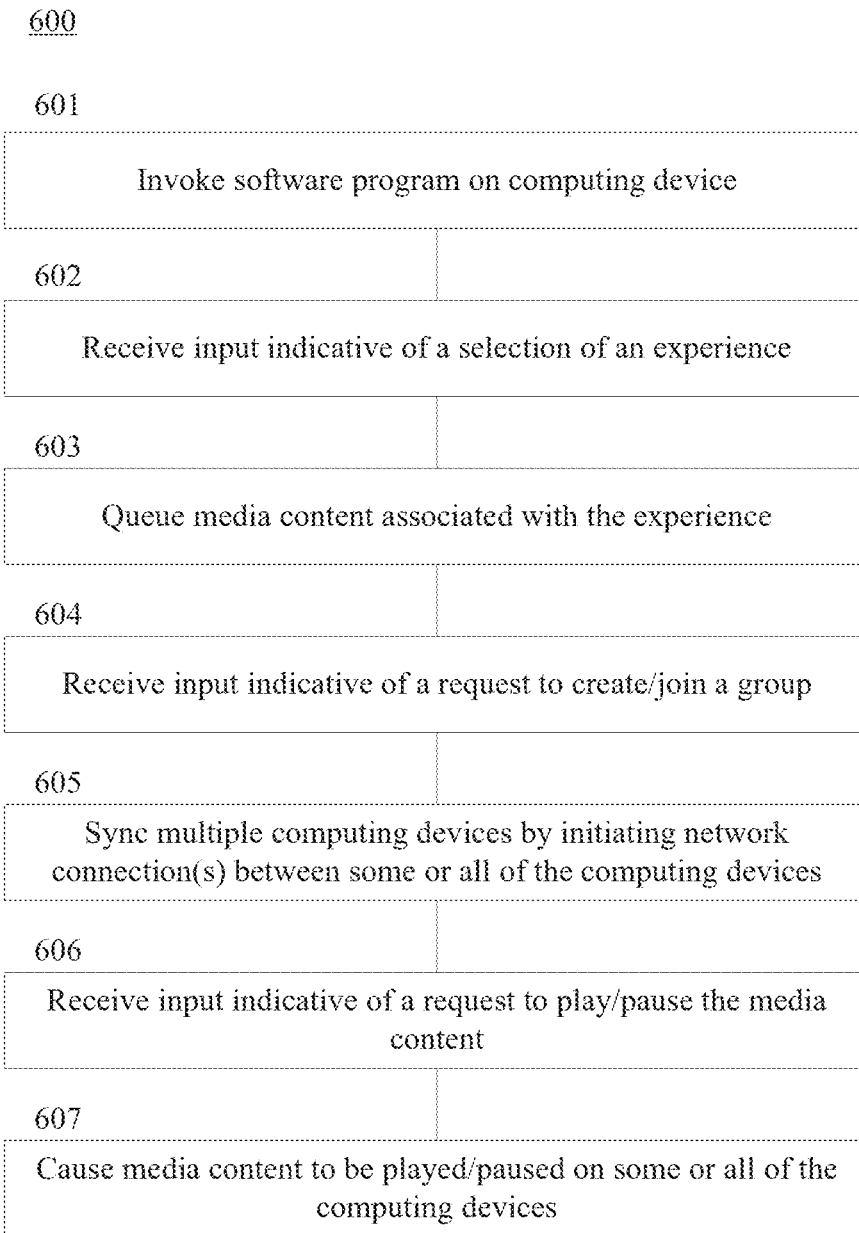
FIG. 6 depicts a flow diagram of a process for facilitating the consumption of location-based media content by a group of end users.

FIG. 6 depicts a flow diagram of a process 600 for facilitating the consumption of location-based media content by a group of end users. Steps 601, 602, and 603 of FIG. 6 may be substantially similar to steps 501, 502, and 503 of FIG. 5. In some embodiments, the content distribution platform receives input indicative of a request to create or join a group of end users (step 604). End users may be able to seamlessly remove themselves from the group. Moreover, a group leader may be able to disband the group entirely.

The content distribution platform can then sync the computing devices associated with the group members so that the entire group can experience location-based media content substantially simultaneously. More specifically, the content distribution platform can sync the computing devices by initiating one or more network connections between some or all of the computing devices (step 605). For example, the content distribution platform may initiate a first connection directly between the computing devices (e.g., using a Bluetooth® channel) and a second connection between the computing devices via the network-accessible platform (e.g., using an internet channel or a cellular channel). In such embodiments, the internet/cellular channel may serve as a fallback should the Bluetooth® channel fail.

In some embodiments, each computing device is communicatively coupled to every other computing device (e.g., as part of a mesh communications network). In other embodiments, each computing device is communicatively coupled to a single leader device that relays communications between the group of computing devices. The leader device may also be singularly responsible for communicating with the content distribution platform (e.g., by sending small metadata messages indicative of the group's progress within the experience). In some embodiments, the leader device changes throughout the experience. That is, different computing devices within the group could be recognized as the leader device at different points in time.

The content distribution platform can receive input indicative of a request to play or pause the media content (step 606). The instruction could be in the form of a vocal command (e.g., "Begin the tour.") or a physical interaction with the computing device (e.g., the selection of a mechanical element or digital element accessible on the computing device).

The content distribution platform can then cause media content to be played or paused on some or all of the computing devices (step 607). For example, in some embodiments location-based media content is played/paused only if the instruction is received from the leader device. The content distribution platform could begin playing the location-based media content on all computing devices included in the group at the same time, or could delay playing the location-based media content on some computing devices based on their geographical location. For example, if the group of computing devices are spread out over an area, the content distribution platform may delay presenting certain media content to certain users (e.g., those behind the rest of the group). As another example, the content distribution platform may lengthen the duration of content breaks presented to certain users (e.g., those ahead of the rest of the group). This can be accomplished when the software program and/or the content distribution platform continually monitor the location of individual group members both globally and with respect to one another.

Unless contrary to physical possibility, it is envisioned that the steps described above may be performed in various sequences and combinations. For instance, an end user could elect to join a group after beginning the experience. Other steps could also be included in some embodiments.

Moreover, while certain steps have been described as being performed by the content distribution platform, those skilled in the art will recognize that these steps could also be performed by the software program executing on the computing device. Thus, the software program may initiate playback of media content, monitor the geographical location of the computing device, modify the media content, etc.

Processing System

Figure 7:
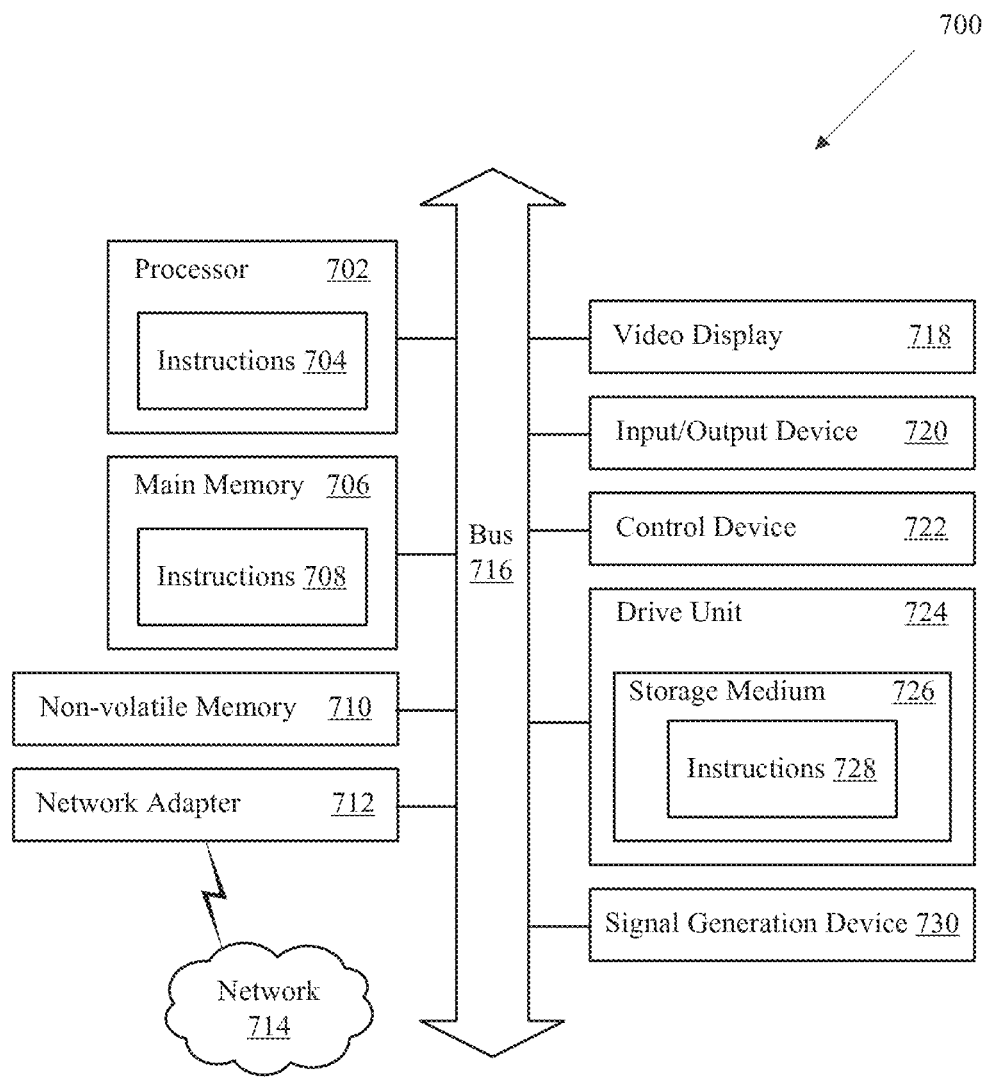
FIG. 7 is a block diagram illustrating an example of a processing system in which at least some operations described herein can be implemented.

FIG. 7 is a block diagram illustrating an example of a processing system 700 in which at least some operations described herein can be implemented. The processing system may include one or more central processing units ("processors") 702, main memory 706, non-volatile memory 710, network adapter 712 (e.g., one or more network interfaces), video display 718, input/output devices 720, control device 722 (e.g., keyboard/pointing devices), drive unit 724 including a storage medium 726, and signal generation device 730 that are communicatively connected to a bus 716.

The bus 716 is illustrated as an abstraction that represents one or more separate physical buses, point-to-point connections, or both that are connected by appropriate bridges, adapters, or controllers. Therefore, the bus 716 can include a system bus, Peripheral Component Interconnect (PCI) bus or PCI-Express bus, HyperTransport interface, Industry Standard Architecture (ISA) bus, Small Computer System Interface (SCSI) bus, Universal Serial Bus (USB), Inter-Integrated Circuit (I²C or I2C) bus, or Institute of Electrical and Electronics Engineers (IEEE) standard 1394 bus (also referred to as "Firewire").

In some embodiments the processing system 700 operates as part of a remote server system on which a content distribution platform is hosted, while in other embodiments the processing system 700 operates as part of a computing device (e.g., a mobile phone, tablet computer, or desktop computer) that is communicatively connected to the remote server system via a wired channel or a wireless channel. Moreover, the processing system 700 could also operate as part of a computing device that is not communicatively connected to any remote server systems. The processing system 700 share a similar computer processor architecture as that of a desktop computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality systems (e.g., a head-mounted display such as Oculus Rift® and Microsoft Hololens®), or another electronic device capable of executing a set of instructions (sequential or otherwise) that specify action(s) to be taken by the processing system 700.

While the main memory 706, non-volatile memory 710, and storage medium 726 (also referred to as a "machine-readable medium") are shown to be a single medium, the term "storage medium" should be taken to include a single medium or multiple media (e.g., centralized or distributed databases, and/or associated caches and servers) that store one or more sets of instructions 728. The term "storage medium" shall also be taken to include any medium that is capable of storing, encoding, or carrying a set of instructions for execution by the processing system 700 and that cause the processing system to perform any of the methodologies of the embodiments.

In general, the routines executed to implement the embodiments may be implemented as an operating system process or a dedicated application, component, program, object, module, or sequence of instructions (which are collectively referred to as "computer programs"). The computer program typically comprises one or more instructions (e.g., instructions 704, 708, 728) set at various times in various memory/storage devices in a computing device, and that, when read and executed by the processor(s) 702, cause the processing system 700 to perform operations to execute various aspects of the embodiments.

Moreover, while certain embodiments may be described in the context of fully functioning computing devices, those skilled in the art will appreciate that the embodiments are capable of being distributed as a software program product in a variety of forms. The disclosure applies equally regardless of the particular type of machine or computer-readable media used to actually effect the distribution.

Further examples of machine-readable (storage) media include recordable media such as volatile and non-volatile memory devices 710, floppy disks and other removable disks, hard disk drives, optical disks (e.g., Compact Disk Read-Only Memory (CD ROMS) and Digital Versatile Disks (DVDs)), and transmission media, such as digital communication links and analog communication links.

The network adapter 712 enables the processing system 700 to mediate data in a network 714 with an entity that is external to the processing system 700 through any known/convenient communications protocol supported by the processing system 700 and the external entity. For example, the processing system 700 and the external entity may communicate via Wi-Fi, Bluetooth®, Near Field Communication (NFC), cellular, infrared, radio-frequency identification (RFID), etc. Accordingly, the network adapter 712 can include a network adaptor card, a wireless network interface card, a router, an access point, a wireless router, a switch, a multilayer switch, a protocol converter, a gateway, a bridge, a bridge router, a hub, a digital media receiver, a repeater, etc.

The techniques introduced here can be implemented by, for example, programmable circuitry (e.g., one or more microprocessors) programmed with software and/or firmware, special-purpose hardwired (i.e., non-programmable) circuitry, or in a combination of such forms. Circuitry can be in the form of application-specific integrated circuits (ASIC s), programmable logic devices (PLDs), field-programmable gate arrays (FPGAs), etc.

Remarks

The foregoing examples of various embodiments have been provided for the purposes of illustration and description. These examples are not intended to be exhaustive. Many variations will be apparent to one skilled in the art. Certain embodiments were chosen in order to best describe the principles of the technology introduced herein, thereby enabling others skilled in the relevant art to understand the claimed subject matter, the various embodiments, and the variations that may be suited to particular uses.

The language used in the specification has been principally selected for readability and instructional purposes. It may not have been selected to delineate or circumscribe the subject matter. Therefore, it is intended that the scope of the technology be limited not by this specification, but rather by any claims that issue based hereon. Accordingly, the disclosure of the technology is intended to be illustrative (rather than limiting) of the scope of the technology, which is set forth in the following claims.

What is claimed is:

1. A computer-implemented method comprising:
receiving first input indicative of a selection of a location-based experience at an interface presented by a computing device;
retrieving location-based media content associated with the location-based experience from a storage;
queueing the location-based media content for download by the computing device;
receiving second input indicative of a request to initiate the location-based experience;
causing playback of the location-based media content by the computing device;
receiving metadata specifying a geographical location of the computing device;
dynamically modifying the location-based media content based on the geographical location of the computing device;
receiving third input indicative of a request to join a group that includes multiple users who have indicated an interest in participating in the location-based experience; and
syncing multiple computing devices associated with the multiple users,
wherein said syncing the multiple computing devices enables the multiple users to consume the location-based media content substantially simultaneously.

2. The computer-implemented method of claim 1, wherein said receiving the metadata specifying the geographical location of the computing device occurs periodically.

3. The computer-implemented method of claim 1, wherein said receiving the metadata specifying the geographical location of the computing device occurs continually, and wherein said dynamically modifying the location-based media content occurs in real time as a user participates in the location-based experience.

4. The computer-implemented method of claim 1, wherein said syncing comprises:
initiating, for each computing device of the multiple computing devices, a network connection with at least one other computing device of the multiple computing devices.

5. The computer-implemented method of claim 4, wherein the network connection is formed via a Bluetooth communication channel.

6. The computer-implemented method of claim 4, wherein the network connection is one of multiple network connections originating from a specified computing device.

7. The computer-implemented method of claim 6, wherein the multiple network connections include:
a first network connection between the specified computing device and another computing device of the multiple computing devices,
wherein the first network connection is formed via a Bluetooth communication channel, and
a second network connection between the specified computing device and a network-accessible computer server,
wherein the second network connection is formed via a cellular network or the Internet.

8. The computer-implemented method of claim 1, further comprising:
continually monitoring the geographical location of the computing device; and
determining whether the computing device has come within a specified proximity of a specified geographical area.

9. The computer-implemented method of claim 8, wherein the specified geographical area is defined by a Global Positioning System (GPS) coordinate, a wireless access point (WAP) identifier, or an audible identifier indicative of an object within the specified geographical area.

10. The computer-implemented method of claim 1, wherein said dynamically modifying the location-based media content comprises performing at least one of:
removing an existing segment of the location-based media content;
altering an existing segment of the location-based media content; and
adding a new segment to the location-based media content.

11. The computer-implemented method of claim 1, wherein the computer-implemented method uses the syncing of the multiple computing devices to share a processing load amongst the group, thereby reducing the power drained from any particular one of the multiple computing devices.

12. The computer-implemented method of claim 11, wherein the multiple computing devices comprise a leader device and wherein the leader device causes different ones of the multiple computing devices to periodically upload location metadata to a content distribution platform to reduce the power drained from any particular one of the multiple computing devices.

13. The computer-implemented method of claim 12, wherein the responsibilities of the leader device are passed between the multiple computing devices such that different ones of the multiple computing devices services as the leader device as the location-based media content is consumed by the group.

14. The computer-implemented method of claim 12, wherein the leader device communicates with the content distribution platform on behalf of the group, ensuring that the location-based media content on each computing device within the group remains in sync.

15. A non-transitory computer-readable medium with instructions stored thereon that, when executed by a processor, perform a method comprising:
generating a graphical user interface that allows a user to interface with a software program executing on a computing device;
retrieving location-based media content from a storage;
initiating playback of the location-based media content via the software program;
continually monitoring metadata specifying a geographical location of the computing device;
determining whether the geographical location of the computing device matches an expected location along a route associated with the location-based media content; and
in response to determining that the geographical location of the computing device does not match the expected location along the route, dynamically modifying the location-based media content,
wherein the geographical location of the computing device does not match the expected location along the route due to a temporal misalignment, and
wherein said dynamically modifying the location-based media content comprises performing at least one of:
shortening a segment of the location-based media content to account for the geographical location of the computing device being ahead of the expected location along the route; and
lengthening a segment of the location-based media content to account for the geographical location of the computing device being behind the expected location along the route.

16. The non-transitory computer-readable medium of claim 15, wherein the software program is a mobile application, a desktop software program, a web browser, or an over-the-top (OTT) application.

17. The non-transitory computer-readable medium of claim 15, wherein the storage is accessible to the computing device via a network.

18. The non-transitory computer-readable medium of claim 15, wherein the geographical location of the computing device does not match the expected location along the route due to a geographical misalignment that exceeds a specified distance.

19. The non-transitory computer-readable medium of claim 18, further comprising:
causing playback of a verbal instruction intended to guide the user to the route.

20. The non-transitory computer-readable medium of claim 15, wherein said dynamically modifying the location-based media content is performed based on a comparison of the geographical location of the computing device and the expected location along the route.

21. The system of claim 15, wherein a segment of the location-based media content is shortened or lengthened by automatically modifying a timeline associated with the location-based media content.

* * * * *